(12) United States Patent
Chen et al.

(10) Patent No.: US 10,216,067 B2
(45) Date of Patent: Feb. 26, 2019

(54) INTERNET PROTOCOL CAMERA WITH EFFICIENT HEAT CONDUCTION PATH

(71) Applicant: Sercomm Corporation, Taipei (TW)

(72) Inventors: Chia-An Chen, Taipei (TW); Shao-Chun Hung, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 15/901,860

(22) Filed: Feb. 21, 2018

(65) Prior Publication Data

US 2018/0259832 A1   Sep. 13, 2018

(30) Foreign Application Priority Data

Mar. 9, 2017 (CN) .................... 2017 2 0225851 U

(51) Int. Cl.
*G03B 17/55* (2006.01)
*G03B 17/56* (2006.01)
*H04N 5/225* (2006.01)

(52) U.S. Cl.
CPC ........... *G03B 17/55* (2013.01); *G03B 17/561* (2013.01); *H04N 5/2252* (2013.01)

(58) Field of Classification Search
None
See application file for complete search history.

(56) References Cited

U.S. PATENT DOCUMENTS

| | | | |
|---|---|---|---|
| 2005/0184386 A1* | 8/2005 | Suzuki | G03B 17/02 257/706 |
| 2010/0220302 A1* | 9/2010 | Gischa | G03F 7/70891 355/30 |
| 2011/0242762 A1* | 10/2011 | Kato | G03B 17/55 361/704 |
| 2015/0070557 A1* | 3/2015 | Petty | H04N 5/2251 348/333.01 |
| 2018/0011390 A1* | 1/2018 | Goulden | G03B 17/55 |
| 2018/0084160 A1* | 3/2018 | Miyashita | H04N 5/2252 |
| 2018/0091775 A1* | 3/2018 | Jung | G03B 17/02 |
| 2018/0187828 A1* | 7/2018 | Law | F16M 13/022 |

* cited by examiner

*Primary Examiner* — William B Perkey
(74) *Attorney, Agent, or Firm* — Winston Hsu

(57) ABSTRACT

The IP Camera of the present invention includes a housing, a heat conducting component, a base and a supporting structure. The heat conducting component is disposed inside the housing to directly contact a heat generating component. The base can be put on or fixed onto a supporting plane, so as to hold a weight of the IP Camera by the supporting plane. An end of the supporting structure extends through the housing to directly contact the heat generating component, and the other end of the supporting structure extends into the base. The heat conducting component and the supporting structure are used to be an uninterrupted heat conduction path between the heat generating component and the base, and a coefficient of heat conductivity of the uninterrupted heat conduction path is greater than 5W/m*K, so that the IP Camera has preferred heat dissipating efficiency.

11 Claims, 6 Drawing Sheets

INTERNET PROTOCOL CAMERA WITH EFFICIENT HEAT CONDUCTION PATH

BACKGROUND OF THE INVENTION

1. Field of the Invention

The present invention relates to an Internet Protocol (IP) camera, and more particularly, to an IP Camera having an efficient heat conduction path.

2. Description of the Prior Art

A housing of a conventional IP Camera is used to accommodate an image capturing module and other electronic components. The image capturing module and the electronic components generate waste heat in operation, and the waste heat may be increased with improvement of computational efficiency. The waste heat accumulated in the housing cannot be effectively dissipated due to the reduced size of the housing, which results in malfunction, failure or damage of the IP Camera. Thus, design of an IP Camera having sufficient heat dissipating efficiency is an important issue in a related industry.

SUMMARY OF THE INVENTION

The present invention provides an IP Camera having enhanced heat dissipating efficiency via metallic heat conduction for solving above drawbacks.

According to an embodiment of the claimed invention, the IP Camera includes a housing, a heat conducting component, a base and a supporting structure. The heat conducting component is disposed inside the housing to directly contact a heat generating component. The base can be put on or fixed onto a supporting plane, so as to hold a weight of the IP Camera by the supporting plane. An end of the supporting structure extends through the housing to directly contact the heat generating component, and the other end of the supporting structure extends into the base. The heat conducting component and the supporting structure are used to provide an uninterrupted heat conduction path between the heat generating component and the base, and a coefficient of heat conductivity of the uninterrupted heat conduction path is greater than 5 W/m*K.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
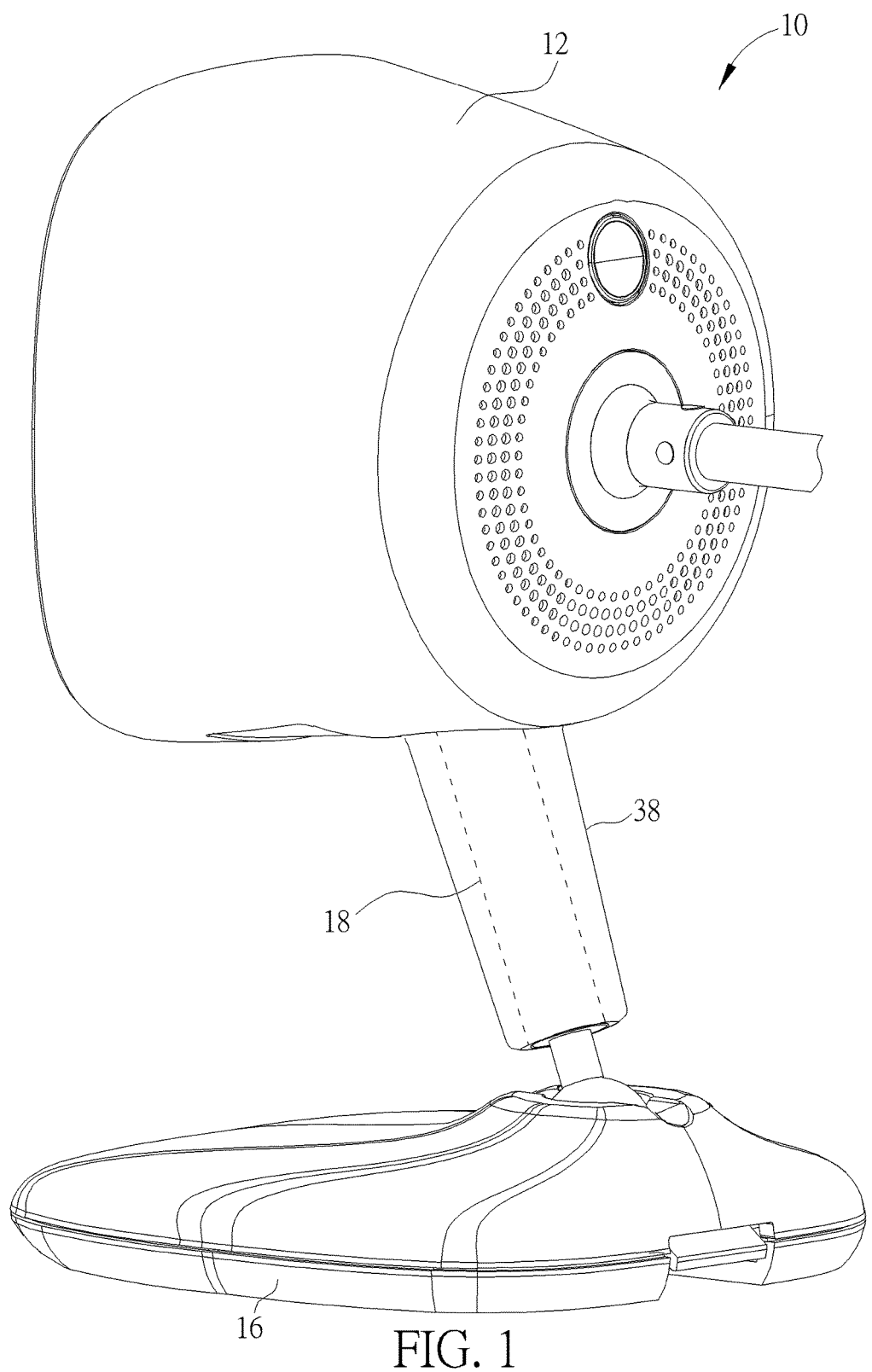
FIG. 1 is a diagram of an IP Camera according to an embodiment of the present invention.
Figure 2:
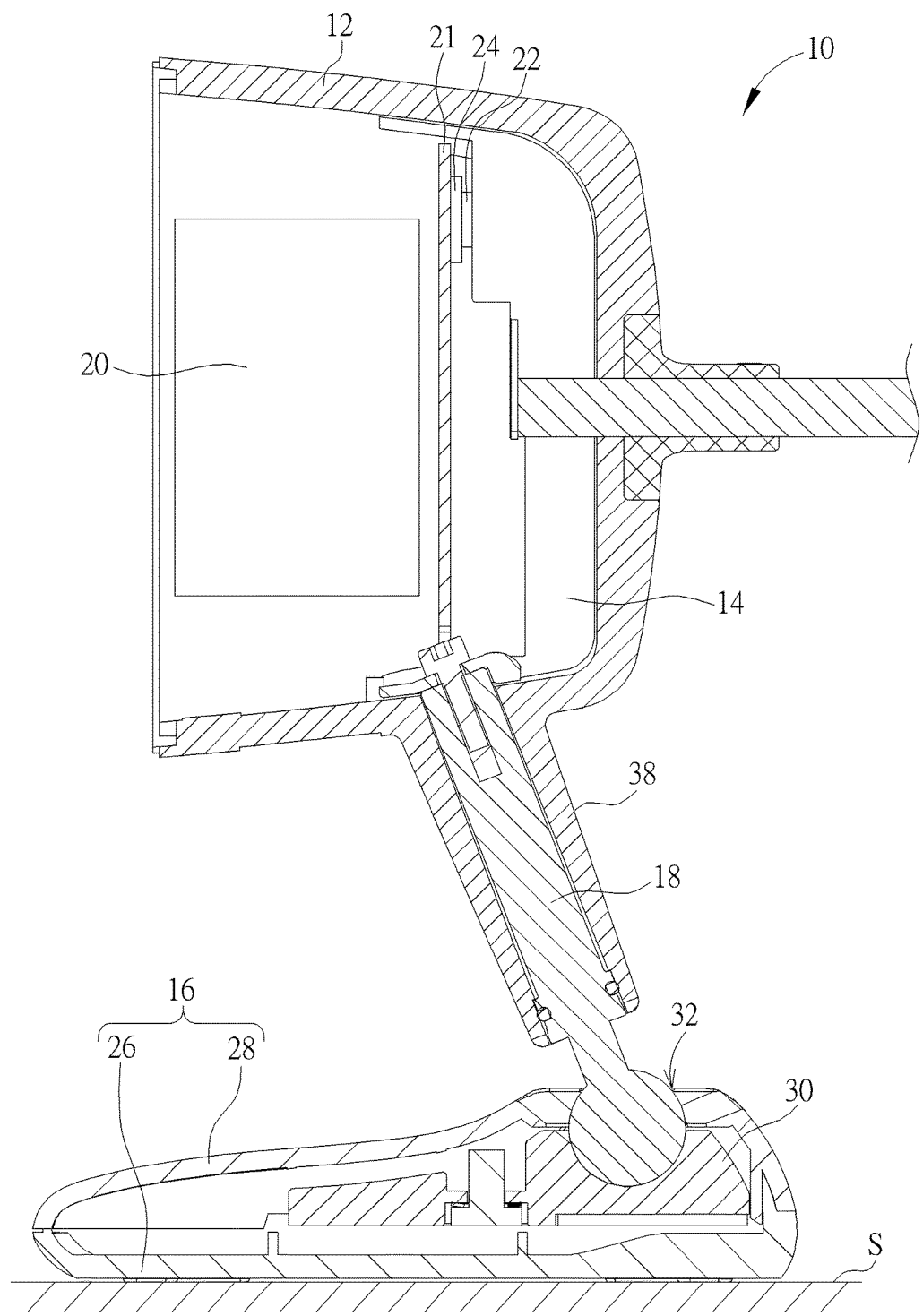
FIG. 2 is a sectional view of the IP Camera according to the embodiment of the present invention.
Figure 5:
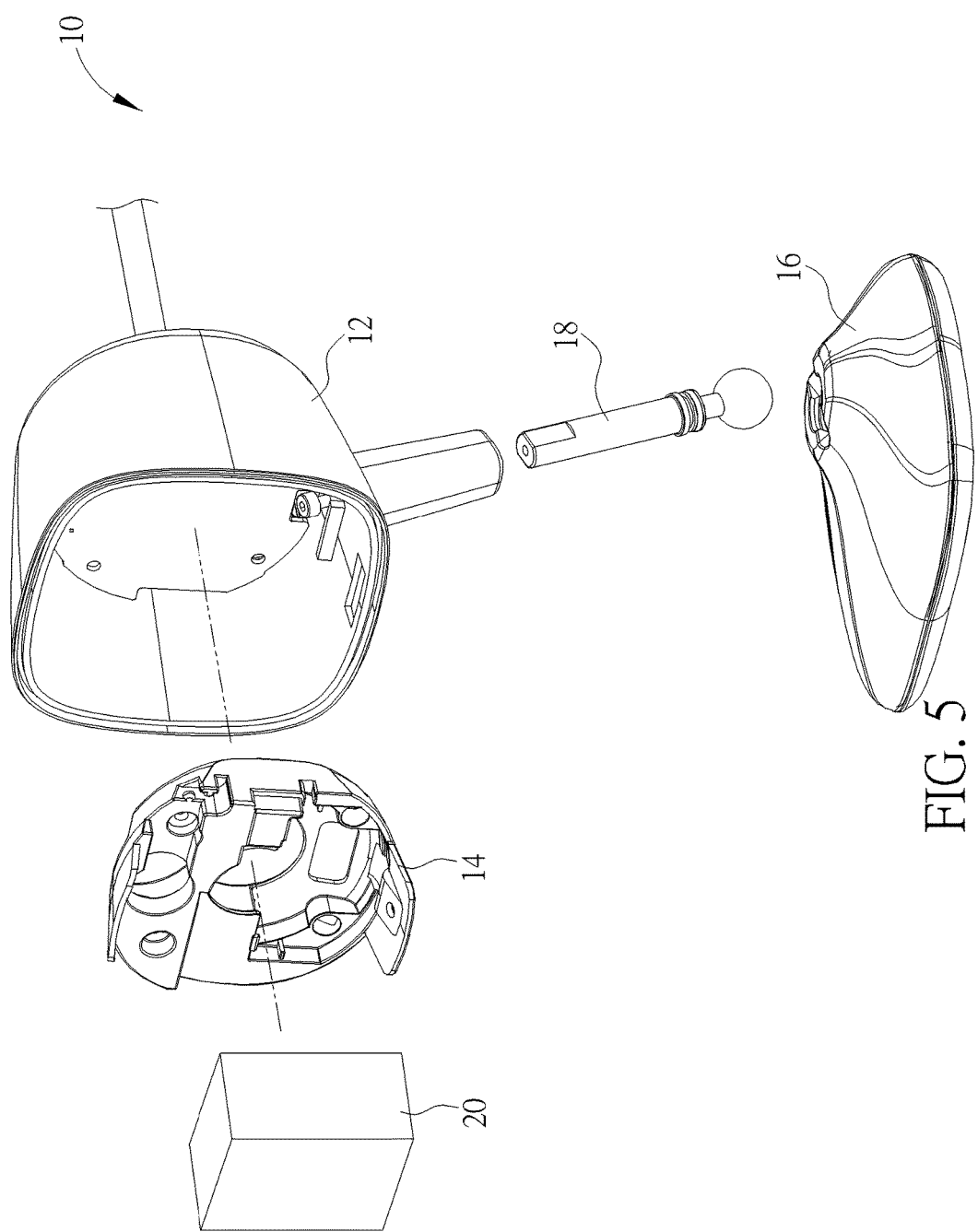
FIG. 5 is an exploded diagram of the IP Camera shown in FIG. 2.

Please refer to FIG. 1, FIG. 2 and FIG. 5. FIG. 1 is a diagram of an IP Camera 10 according to an embodiment of the present invention. FIG. 2 is a sectional view of the IP Camera 10 according to the embodiment of the present invention. FIG. 5 is an exploded diagram of the IP Camera 10 shown in FIG. 2. The IP Camera 10 includes a housing 12, a heat conducting component 14, a base 16 and a supporting structure 18. An image detecting module 20 is disposed inside the housing 12. The heat conducting component 14 is disposed inside the housing 12, and a thermal pad 22 is disposed on a position of the heat conducting component 14 close to a circuit board 21. The heat generating component 24 can be disposed on a lateral surface of the circuit board 21 facing the heat conducting component 14, and directly contact a surface of the thermal pad 22. The other surface of the thermal pad 22 can directly contact the heat conducting component 14. The thermal pad 22 can be viewed as a part of the heat generating component 24, so that the heat conducting component 14 can be viewed as directly contacting the heat generating component 24. The thermal pad 22 may be optionally omitted herein for simplicity. The heat generating component 24 can be a processor or any electronic components. The base 16 can be put on or fixed onto a supporting plane S, and the supporting plane S is used to hold a weight of the IP Camera 10. When the IP Camera 10 is disposed on a table, a wall or a ceiling, the supporting plane S can be defined as a tabletop, a facade of the wall and a surface of the ceiling. The housing 12 is held by the supporting structure 18, and the supporting structure 18 extends away from and is supported by the base 16.

An end of the supporting structure 18 extends into the housing 12 to connect with the heat conducting component 14 in a directly contacting manner, and the other end of the supporting structure 18 extends into the base 16. The heat conducting component 14 and the supporting structure 18 can provide an uninterrupted heat conduction path between the heat generating component 24 and the base 16, and a coefficient of heat conductivity of the uninterrupted heat conduction path is greater than 5 W/m*K. The heat conducting component 14 and the supporting structure 18 are preferably made of metal or any material with enhanced heat conductivity. Heat generated in operation of the heat generating component 24 can be conducted to the base 16 through the thermal pad 22, the heat conducting component 14 and the supporting structure 18, via an uninterrupted metallic heat conduction path or a heat conduction path with enhanced coefficient of heat conductivity formed for dissipation. For preventing the housing 12 from toppling down, the base 16 may have huge sizes, which means contact area between the base 16 and air is increased to provide sufficient heat dissipating efficiency.

For example, the base 16 can be a flat structure, and the supporting structure 18 can extend from the flat structure upwardly. The base 16 may include a bottom casing 26 and a top casing 28. The bottom casing 26 can be a board-typed structure, which can be directly put on the tabletop or locked onto the facade of the wall or the ceiling. The top casing 28 is disposed on the bottom casing 26, and an accommodating space can be formed between the top casing 28 and the bottom casing 26 for accommodating a balanced weight 30. A bridging hole 32 can be formed on a surface of the top casing 28. An end of the supporting structure 18 extends through the bridging hole 32 and is disposed inside the base 16 by directly contacting the balanced weight 30. The supporting structure 18 can have a universal joint optionally disposed on the side closer to the housing 12 or the base 16. Further, two universal joints may be respectively disposed on two ends of the supporting structure 18 and respectively connected with the housing 12 and the base 16. Any structure connected between the housing 12 and the base 16 for holding a weight of the housing 12 by the base 16 belongs to a scope of the supporting structure 18 in the present embodiment.

The balanced weight 30 preferably can be made of material with high density and high heat conductivity, such as metal. The balanced weight 30 can be a block-typed structure. A dimension of the balanced weight 30 is smaller than a dimension of the base 16. The balanced weight 30 can be put between the bottom casing 26 and the top casing 28 for preventing the IP Camera 10 from toppling down. In the present embodiment, the heat generated by the heat generating component 24 is conducted to the balanced weight 30 inside the base 16 through the supporting structure 18 in the directly contacting manner. The heat dissipating efficiency of the IP Camera 10 can be increased by enhancing dimension and material of the balanced weight 30. The heat conducted to the balanced weight 30 can be dissipated out of the IP Camera 10 via the base 16, so that the heat dissipating efficiency of the IP Camera 10 can be improved accordingly.

Figure 3:
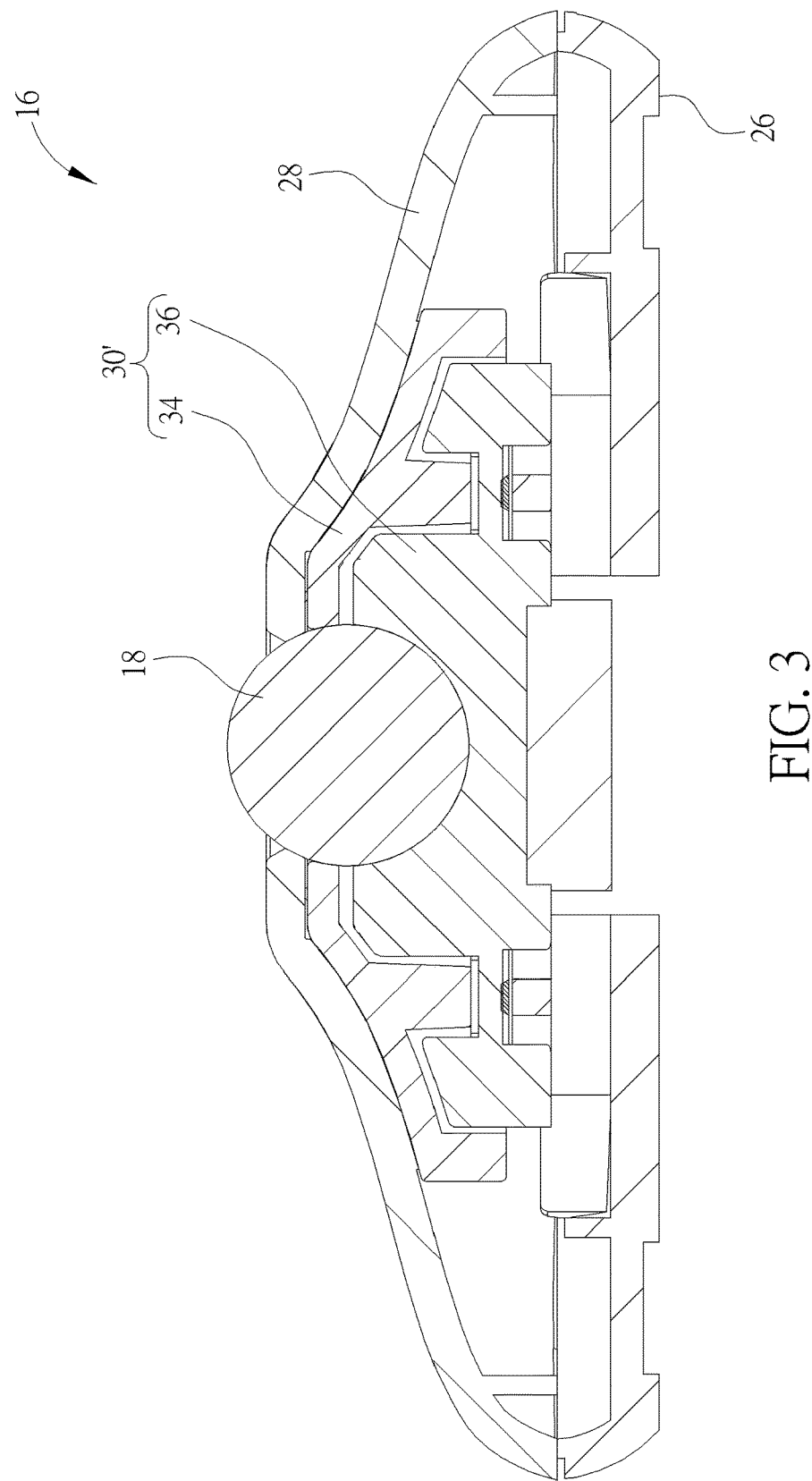
FIG. 3 is an enlarged diagram of a base according to another embodiment of the present invention.

As the embodiment shown in FIG. 2, the balanced weight 30 is an element preferably made of metal or any material with a coefficient of heat conductivity greater than 5 W/m*K. The universal joint of the supporting structure 18 is constrained by the balanced weight 30 and the top casing 28 of the base 16 in a movable and rotatable manner. The universal joint further can be constrained by other structural design, which depends on actual demand. Please refer to FIG. 3. FIG. 3 is an enlarged diagram of the base 16 according to another embodiment of the present invention. As shown in FIG. 3, the balanced weight 30' may include several constraining units, such as a first constraining unit 34 disposed on the bottom casing 26 and a second constraining unit 36 located between the first constraining unit 34 and the top casing 28. The universal joint of the supporting structure 18 can be disposed between the first constraining unit 34 and the second constraining unit 36 in a rotatable manner. At least one of the first constraining unit 34 and the second constraining unit 36 is preferably made of metal or any material with the coefficient of heat conductivity greater than 5 W/m*K.

As shown in FIG. 1 and FIG. 2, the IP Camera 10 may optionally include a heat isolating component 38 covering apart of the supporting structure 18 located between the housing 12 and the base 16. The heat isolating component 38 is used to prevent user's finger, palm, or skin from burned injury while the user touches the high-temperature supporting structure 18. The coefficient of heat conductivity of the heat isolating component 38 is preferably smaller than 5 W/m*K. The heat isolating component 38 can be monolithically integrated with the housing 12 or the base 16, which depends on position of the universal joint on the supporting structure 18. For example, while the universal joint of the supporting structure 18 is connected with the base 16, the heat isolating component 38 can be monolithically integrated with the housing 12 so that the supporting structure 18 can be conveniently installed into the heat isolating component 38 via an opening of the heat isolating component 38 close to the base 16. While the universal joint of the supporting structure 18 is connected with the housing 12, the heat isolating component 38 can be monolithically integrated with the base 16. Further, the heat isolating component 38 can be an independent element directly disposed on the supporting structure 18 in a detachable manner. The heat isolating component 38 may be monolithically integrated with the supporting structure 18.

Figure 4:
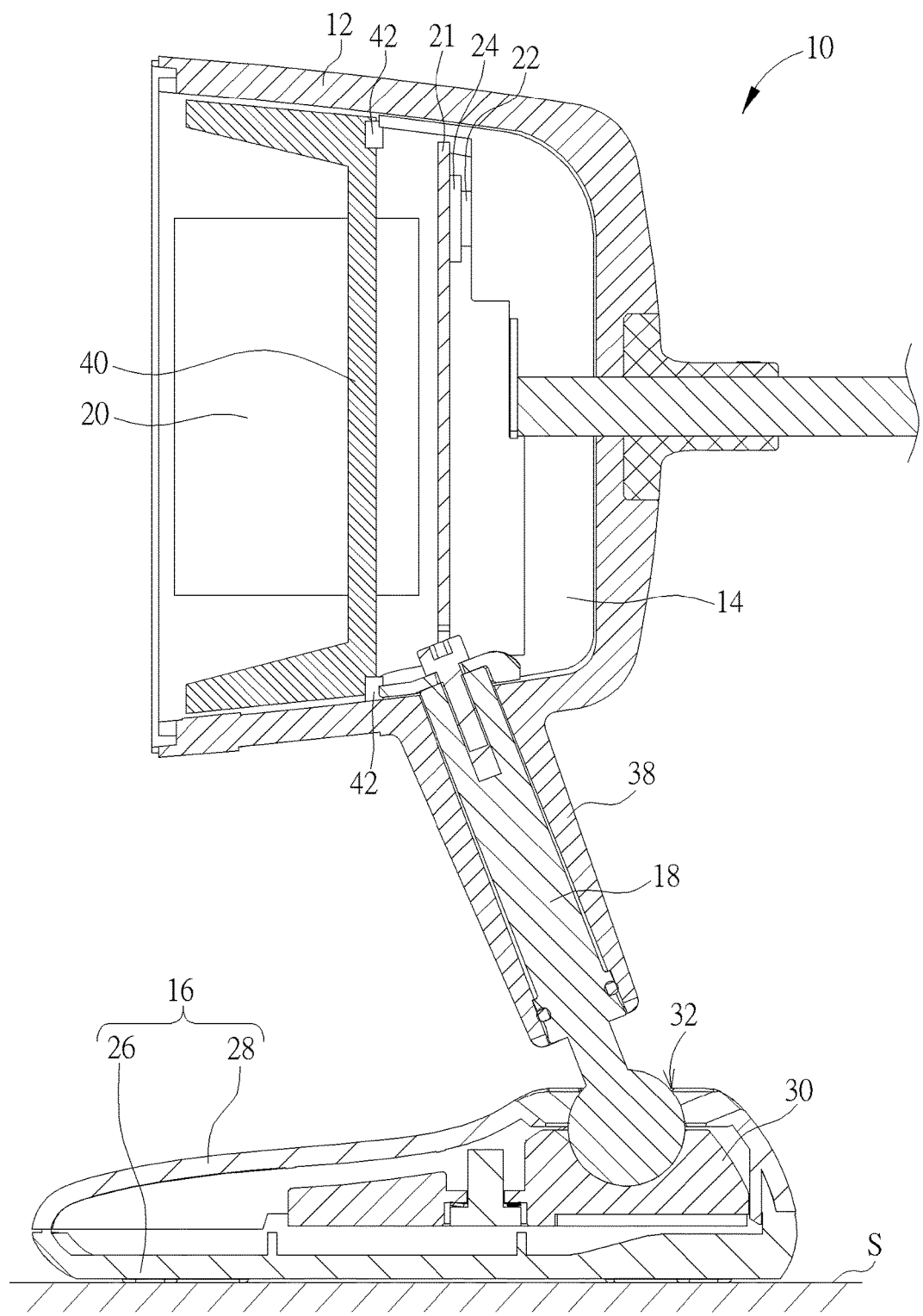
FIG. 4 is a sectional view of the IP Camera according to another embodiment of the present invention.
Figure 6:
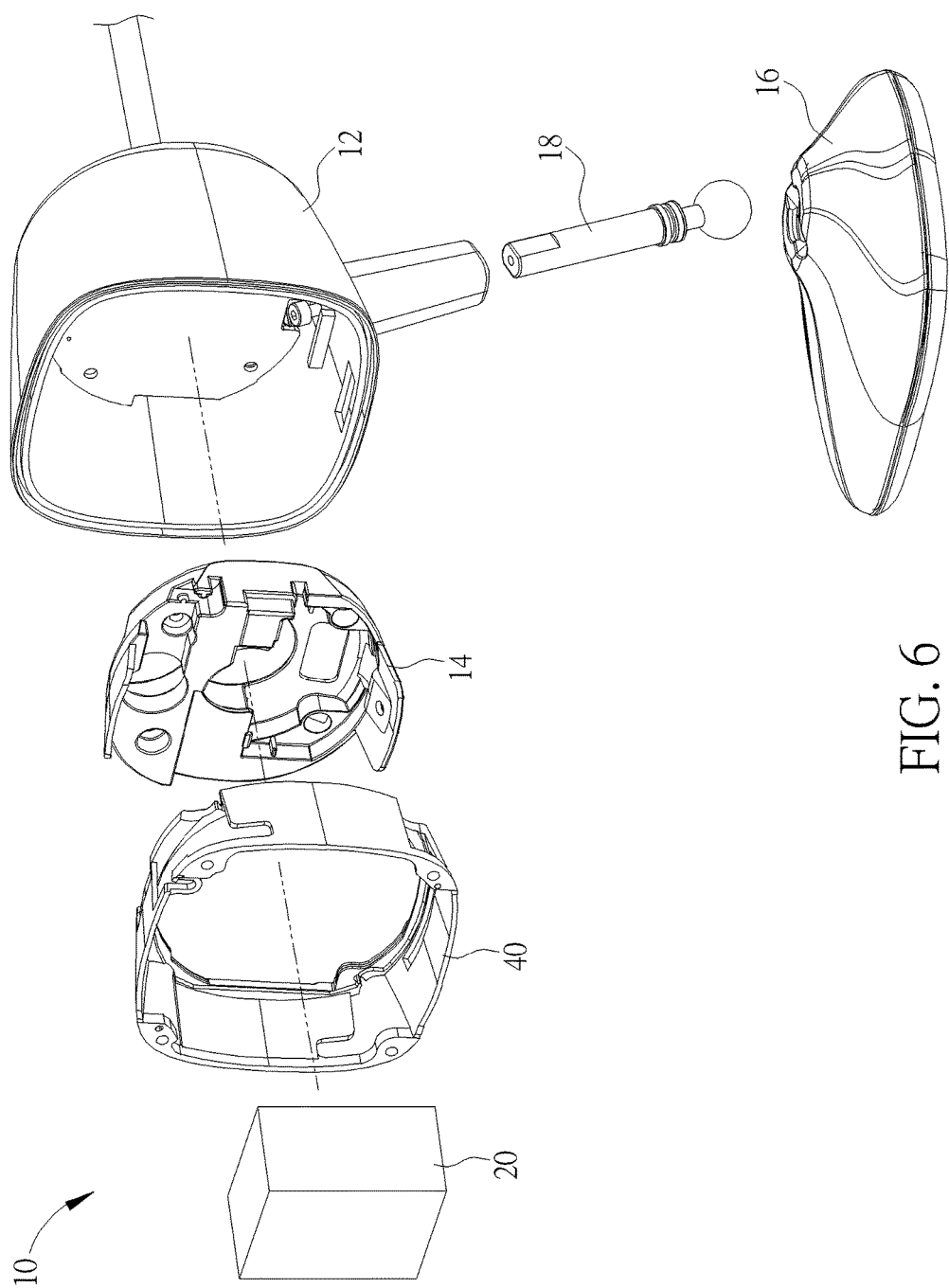
FIG. 6 is an exploded diagram of the IP Camera shown in FIG. 6.

Please refer to FIG. 4 and FIG. 6. FIG. 4 is a sectional view of the IP Camera 10 according to another embodiment of the present invention. FIG. 6 is an exploded diagram of the IP Camera 10 shown in FIG. 4. The IP Camera 10 may further include a frame 40 disposed inside the housing 12. The frame 40 can directly contact the heat conducting component 14 optionally through a thermal pad 42. The coefficient of heat conductivity of the frame 40 is preferably greater than 5 W/m*K. The heat generating component 24 may be disposed on two opposite surfaces of the circuit board 21. While the heat generating component 24 is disposed on a surface of the circuit board 21 opposite to the heat conducting component 14, the heat generated by the heat generating component 24 can be conducted to the heat conducting component 14 through the frame 40 and the thermal pad 42, and then conducted to the balanced weight 30 of the base 16 through the supporting structure 18 in the directly contacting and uninterrupted manner. Therefore, the heat is rapidly dissipated out of the IP Camera 10 by high-efficiency heat dissipating function of the uninterrupted heat conduction path.

In conclusion, the IP Camera of the present invention can connect the supporting structure with the balanced weight inside the base in the directly contacting manner. The heat generated by the heat generating component is conducted to the balanced weight through the supporting structure, and can be rapidly dissipated via the balanced weight. Constraint of the supporting structure inside the base can be varied in accordance with position of the universal joint and structural type of the balanced weight, which depends on design demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An IP Camera comprising:
   a housing;
   a heat conducting component disposed inside the housing to directly contact a heat generating component;
   a base to be put on or fixed onto a supporting plane, so as to hold a weight of the IP Camera by the supporting plane; and
   a supporting structure, an end of the supporting structure extending through the housing to directly contact the heat conducting component, and the other end of the supporting structure extending through the base to hold a weight of the housing by the base; and
   a heat isolating component covering a part of the supporting structure located between the housing and the base;
   wherein the heat conducting component and the supporting structure are used to provide an uninterrupted heat conduction path between the heat generating component and the base, and a coefficient of heat conductivity of the uninterrupted heat conduction path is greater than 5 W/m*K.

2. The IP Camera of claim 1, wherein the base comprises a bottom casing and a top casing, the top casing is disposed on the bottom casing, and a bridging hole is formed on a surface of the top casing configured to be extended through by the supporting structure.

3. The IP Camera of claim 1, wherein the heat conducting component and the supporting structure are made of metal.

4. The IP Camera of claim 1, wherein a balanced weight is disposed inside the base, and the supporting structure is connected to the base by directly contacting the balanced weight.

5. The IP Camera of claim 4, wherein a universal joint of the supporting structure is rotatably disposed between the balanced weight and a top casing of the base, and a coefficient of heat conductivity of the balanced weight is greater than 5 W/m*K.

6. The IP Camera of claim 5, wherein the balanced weight is made of metal.

7. The IP Camera of claim 4, wherein the balanced weight comprises a first constraining unit and a second constraining unit, the first constraining unit is disposed on a bottom casing of the base, the second constraining unit is located between the first constraining unit and a top casing of the base, a universal joint of the supporting structure is rotatably disposed between the first constraining unit and the second constraining unit, and a coefficient of heat conductivity of at least one of the first constraining unit and the second constraining unit is greater than 5 W/m*K.

8. The IP Camera of claim 7, wherein at least one of the first constraining unit and the second constraining unit is made of metal.

9. The IP Camera of claim 1, wherein the IP Camera further comprises a frame disposed inside the housing to directly contact the heat conducting component, and a coefficient of heat conductivity of the frame is greater than 5 W/m*K.

10. The IP Camera of claim 1, wherein the IP Camera a coefficient of heat conductivity of the heat isolating component is smaller than 5 W/m*K.

11. The IP Camera of claim 1, wherein the supporting structure is a multidirectional axle component.

* * * * *